Sept. 19, 1967        K. A. BROWNE        3,342,141
CONVERTIBLE RAIL-HIGHWAY VEHICLE TRUCK
Filed May 3, 1965        12 Sheets-Sheet 1

INVENTOR.
KENNETH A. BROWNE
BY
*Sanford Schnurmacher*
ATTORNEY.

INVENTOR.
KENNETH A. BROWNE
BY
Sanford Schnurmacher
ATTORNEY

Sept. 19, 1967  K. A. BROWNE  3,342,141
CONVERTIBLE RAIL-HIGHWAY VEHICLE TRUCK
Filed May 3, 1965  12 Sheets-Sheet 5

INVENTOR.
KENNETH A. BROWNE
BY Sanford Schnurmacher
ATTORNEY.

INVENTOR.
KENNETH A. BROWNE
BY
ATTORNEY.

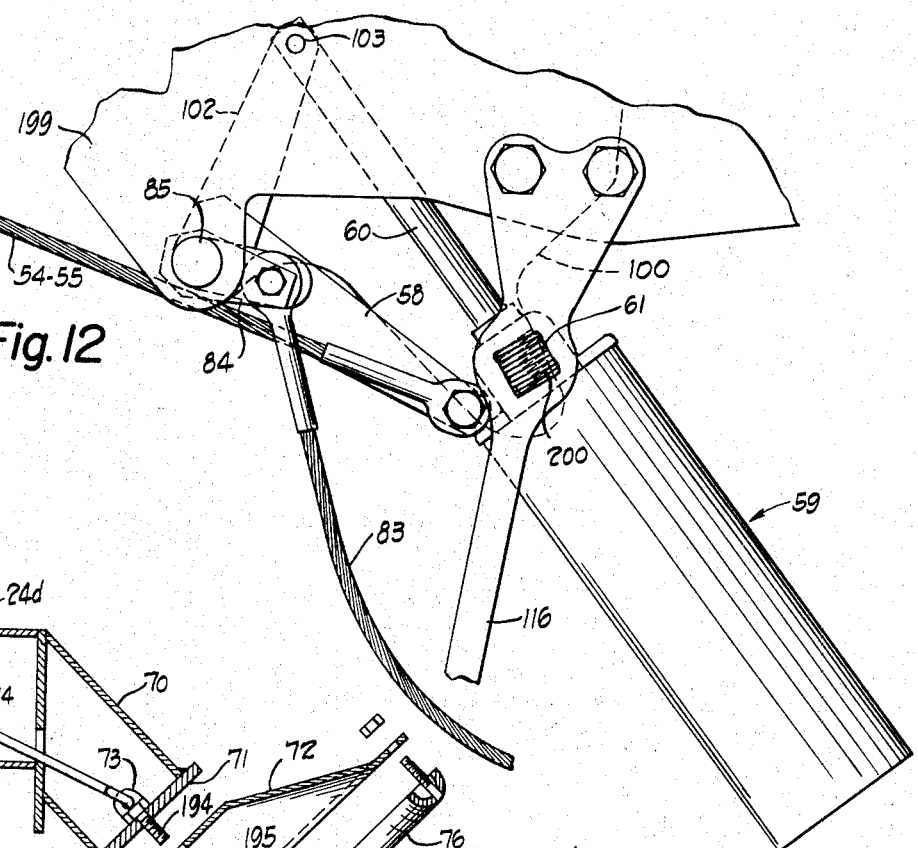
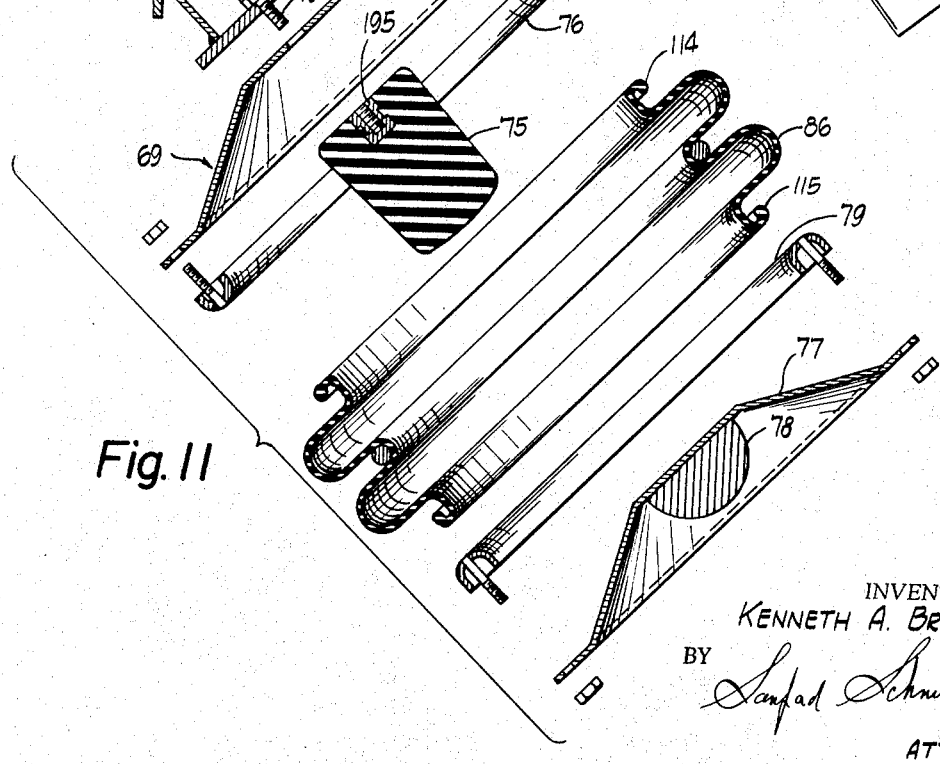

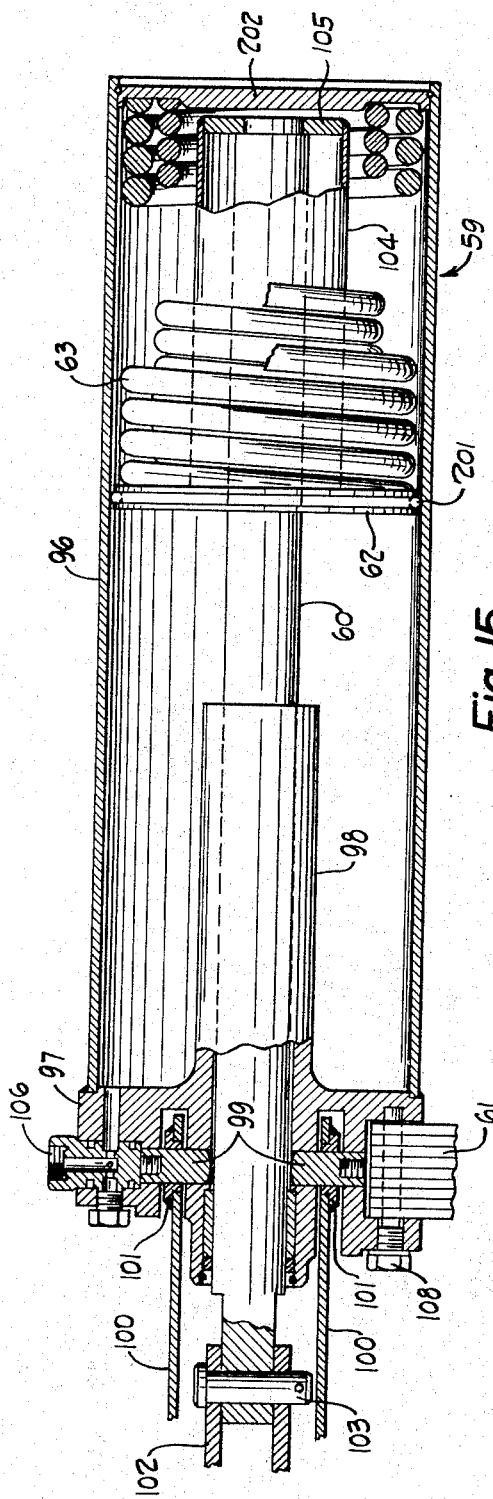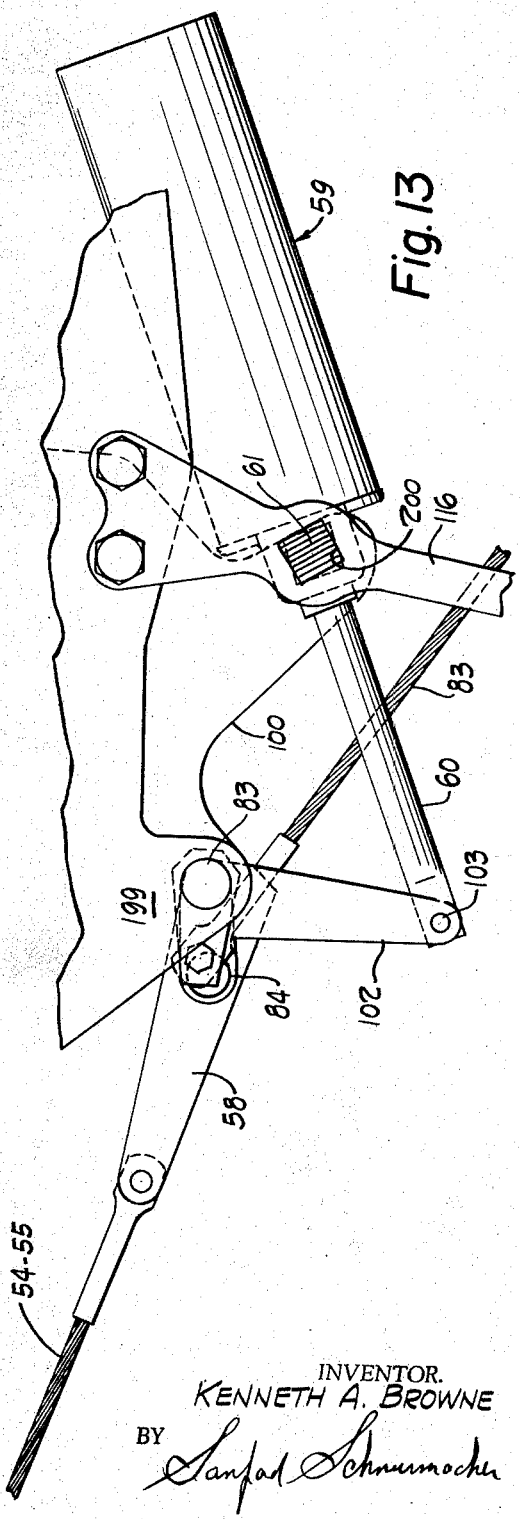

Sept. 19, 1967  K. A. BROWNE  3,342,141
CONVERTIBLE RAIL-HIGHWAY VEHICLE TRUCK
Filed May 3, 1965  12 Sheets-Sheet 9
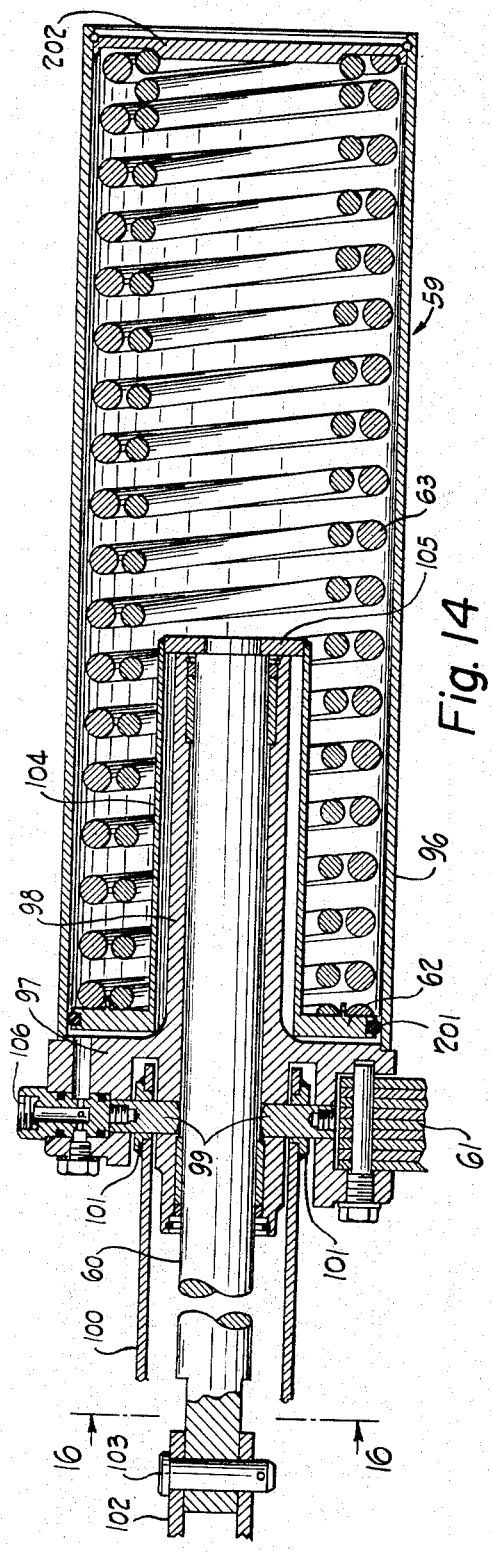
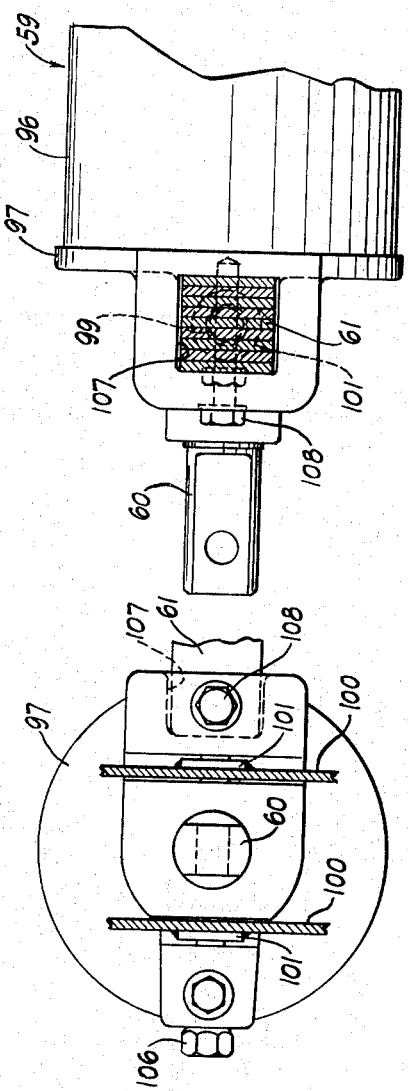
INVENTOR.
KENNETH A. BROWNE
BY
Sanford Schnurmacher
ATTORNEY.

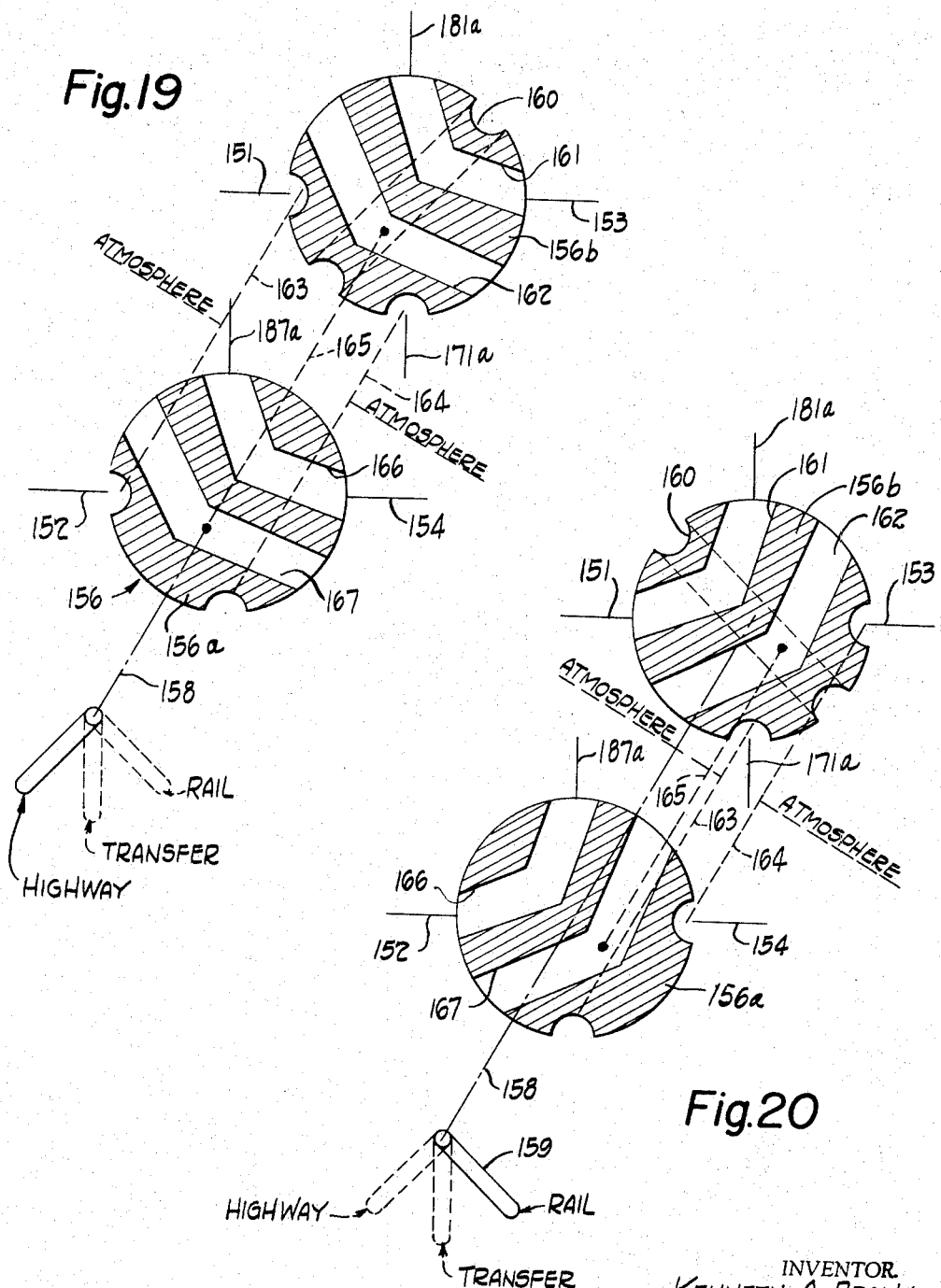

United States Patent Office 3,342,141
Patented Sept. 19, 1967

3,342,141
CONVERTIBLE RAIL-HIGHWAY VEHICLE TRUCK
Kenneth A. Browne, Lakewood, Ohio, assignor to The Chesapeake and Ohio Railway Company, Cleveland, Ohio, a corporation of Virginia
Filed May 3, 1965, Ser. No. 452,601
14 Claims. (Cl. 105—215)

ABSTRACT OF THE DISCLOSURE

A road-rail vehicle having an air-spring suspension unit, equipped with two sets of road wheels and a single set of rail wheels, and selective air-spring inflation and deflation means which are interlocked so that the steps of transferring from a road wheel condition to a rail wheel condition, and vice-versa, are carried out in a safe and rapid manner by the use of a single transfer valve having a control handle movable between three operating positions.

This invention relates to vehicles of the kind adapted for travel either on pavements or on railway rails, and more particularly to a novel wheel suspension unit having road wheels and rail wheels adapted to be selectively brought into a load-carrying position.

The primary object of the invention is to provide a road-rail vehicle having selectively usable sets of double-axle road wheels, arranged in tandem to provide the low axle-load required for highway operation, and single-axle rail wheels together with novel spring-powered means for moving the sets of wheels to and from a load-carrying position.

Another object is to provide a road-rail vehicle, of the type stated, having two independently mounted air springs for each axle, including novel means for detachably mounting each air spring, between the vehicle frame and axle, for quick and easy replacement.

Another object is to provide axle stowing means and selective air spring inflation and deflation means which are interlocked so that the steps of transferring from a road-wheel condition to a rail-wheel condition, and vice-versa, are carried out in a safe and rapid manner by the use of a single transfer valve having a control handle movable between three operating positions.

The invention further provides a novel, air conserving and metering, pneumatic system, for the inflation and deflation of the highway and rail air springs, that directs the flow of air from the springs of the running gear about to be stowed into the air springs of the running gear about to be brought into load-carrying position, to effect the initial inflation thereof, and then automatically regulates the load-carrying spring air pressure to maintain the floor of the vehicle at a predetermined height above the load-carrying axles, while travelling on either the highway or rails, to provide uniform riding characteristics, whether the vehicle is empty or fully loaded.

Still another object is to provide a vehicle, of the type stated, whose rail-wheel braking power is proportioned to the air-pressure maintained in the rail running-gear air springs, so that premature locking of the rail wheels is prevented when running under light loads.

These, and other objects of the invention will become apparent from a reading of the following specification and claims, together with the accompanying drawings, wherein like parts are referred to and indicated by like reference numerals, and wherein:

FIGURE 11 is an exploded sectional view of one of the rail axle air springs;

FIGURE 12 is a side elevation of one of the axle retractor cylinders showing it in the position whereat the vehicle rail wheels are in the load-supporting position and the road wheels in the stowed position, illustrated in FIGURE 2;

FIGURE 13 is a side elevation of the same axle retractor cylinder, illustrated in FIGURE 12, showing it in the position whereat the vehicle rail wheels are in the stowed position and the road wheels in the load-supporting position, illustrated in FIGURE 1;

FIGURE 14 is a longitudinal sectional view of one of the retractor cylinders, with its piston rod fully extended;

FIGURE 15 is a similar sectional view showing the piston rod fully retracted;

FIGURE 16 is a left end view of the retractor cylinder taken along the line and in the direction of the arrows 16—16 of FIGURE 14;

FIGURE 17 is a side elevation of the retractor cylinder, at its mounting trunnion pin, with portions broken away and in section;

FIGURE 19 is a schematic layout of the transfer control valve only, showing the valve at "Highway" position;

FIGURE 20 is a schematic layout of the transfer control valve only, showing the valve at "Rail" position.

Figure 2:
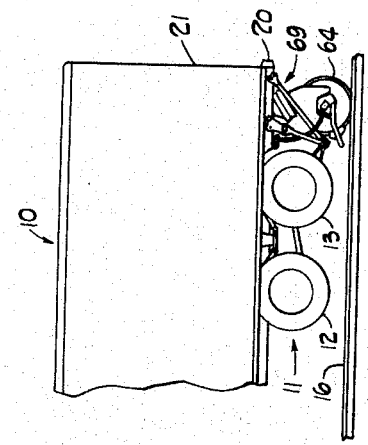
FIGURE 2 is a side elevation of the rear portion of the vehicle illustrated in FIGURE 1, but showing the rail wheels in the load-supporting position.

The present invention provides a road-rail vehicle 10 having a novel air spring wheel suspension unit 11 equipped with two sets of road wheels 12 and 13 and a single set of rail wheels 64, which enable the vehicle to operate either on a road, or pavement, 15, or on rails 16.

The vehicle 10 is here shown as being a load vehicle having a van type body 21 supported by a frame structure 22 to which the wheel suspension unit 11 is attached. As shown in the drawings the wheel suspension unit 11 is located beneath the rear end portion of the frame structure 22. The vehicle 10 is provided with front and rear couplers 19 and 20 of which the front coupler 19 is a male type coupler and the rear coupler 20 is of the socket or female type, such as disclosed in applicant's U.S. Patent No. 2,925,791, issued Feb. 23, 1960.

The front end of the vehicle 10 is supported, either by the engagement of the front coupler 19 in the rear coupler 20 of the next adjacent vehicle when the vehicles are in a train relationship, or by a suitable vehicle landing gear 18, when individual vehicles 10 are disconnected from the train and are left standing in a parked relation. The front end of the vehicle 10 can also be connected, by means of a king pin 17, with a conventional highway tractor unit (not shown) when the vehicle is to be operated on a road or pavement as a van or truck. When the vehicle is connected with such a tractor unit the front end of the vehicle is supported by the tractor unit and the landing gear 18 is then raised and folded to an ineffective position.

Figure 1:
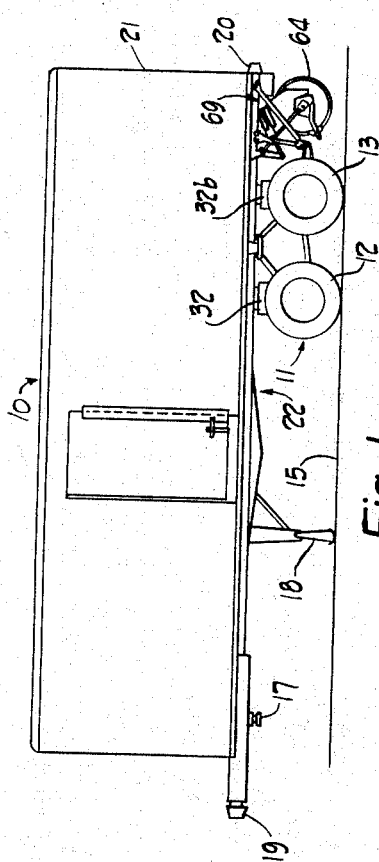
FIGURE 1 is a full length side elevation of a road-rail vehicle embodying the present invention showing the vehicle with the road wheels thereof in the load-supporting position.

FIGURE 1 of the drawing shows the vehicle 10 with the two sets of road wheels 12 and 13 of the wheel suspension unit 11 in engagement with the pavement 15 and with the landing gear 18 in its lowered position for supporting the front end of the vehicle. This condition of the vehicle is a parked condition in which it is ready to have the tractor unit connected to the front end thereof.

FIGURE 2 shows the vehicle 10 with the rail wheels 64 of the suspension unit 11 in engagement with the rails 16, and represents the condition of the vehicle when it is being operated on the railroad track either as an individual car or as one of a train of such cars.

Figure 3:
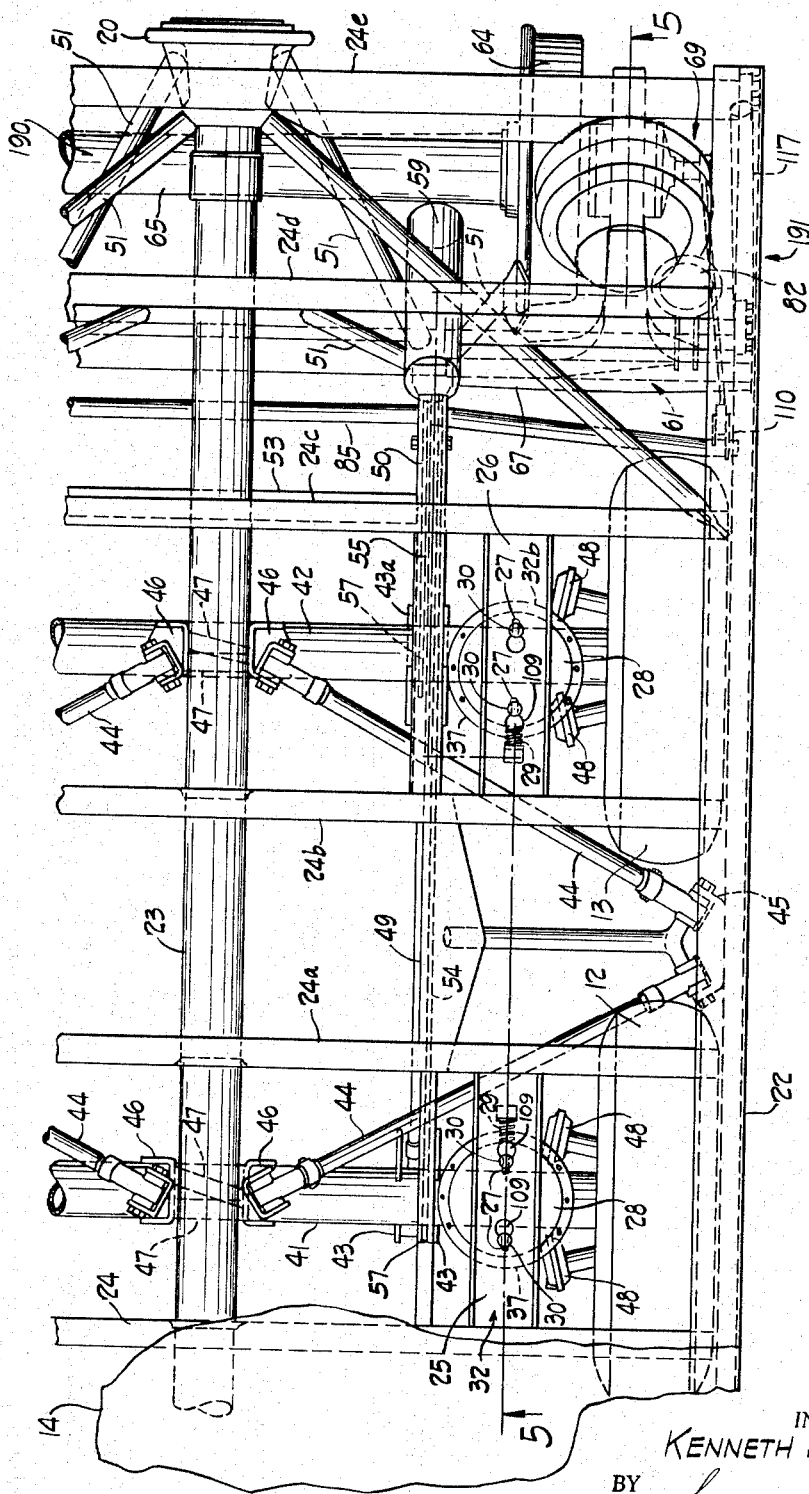
FIGURE 3 is a partial plan view with a portion of the floor of the vehicle body broken away to expose the wheel suspension unit therebelow.

The frame structure 22 which supports a cargo carrying body 21 can be of any suitable construction, and in the preferred form illustrated in FIGURE 3 comprises a longitudinal center sill 23 which extends for substantially the full length of the vehicle body 21, here shown as being of tubular form, having the front coupler 19 mounted at the front end thereof and the rear coupler 20 connected to the rear end thereof.

The frame structure 22 also comprises suitably located transverse crossbearers 24, 24a, 24b, 24c, 24d and 24e, which position the center sill 23 and support the body floor 14.

It will be understood that only one-half of the width of the frame 22 is shown in FIGURE 3, and that the structural components of the road and rail running gear, illustrated in detail, are duplicated on both sides of the center sill 23.

Figure 4:
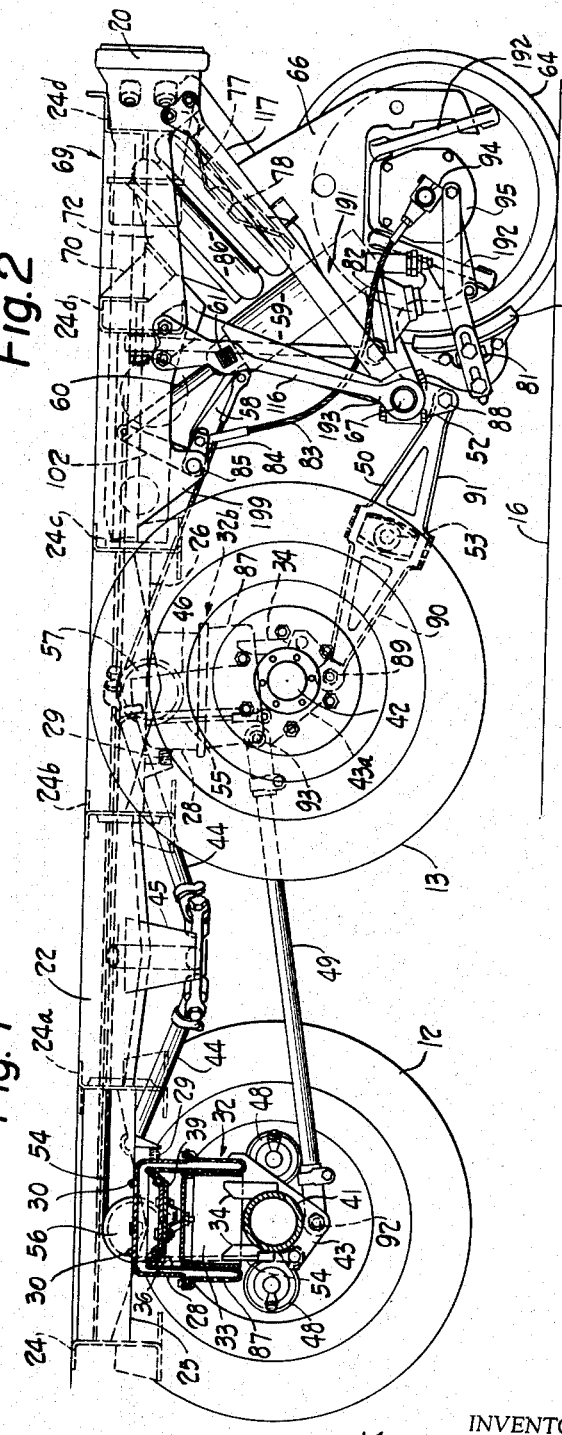
FIGURE 4 is a side elevation, with portions broken away and in section, showing the wheel suspension unit of FIGURE 2 on a larger scale.
Figure 6:
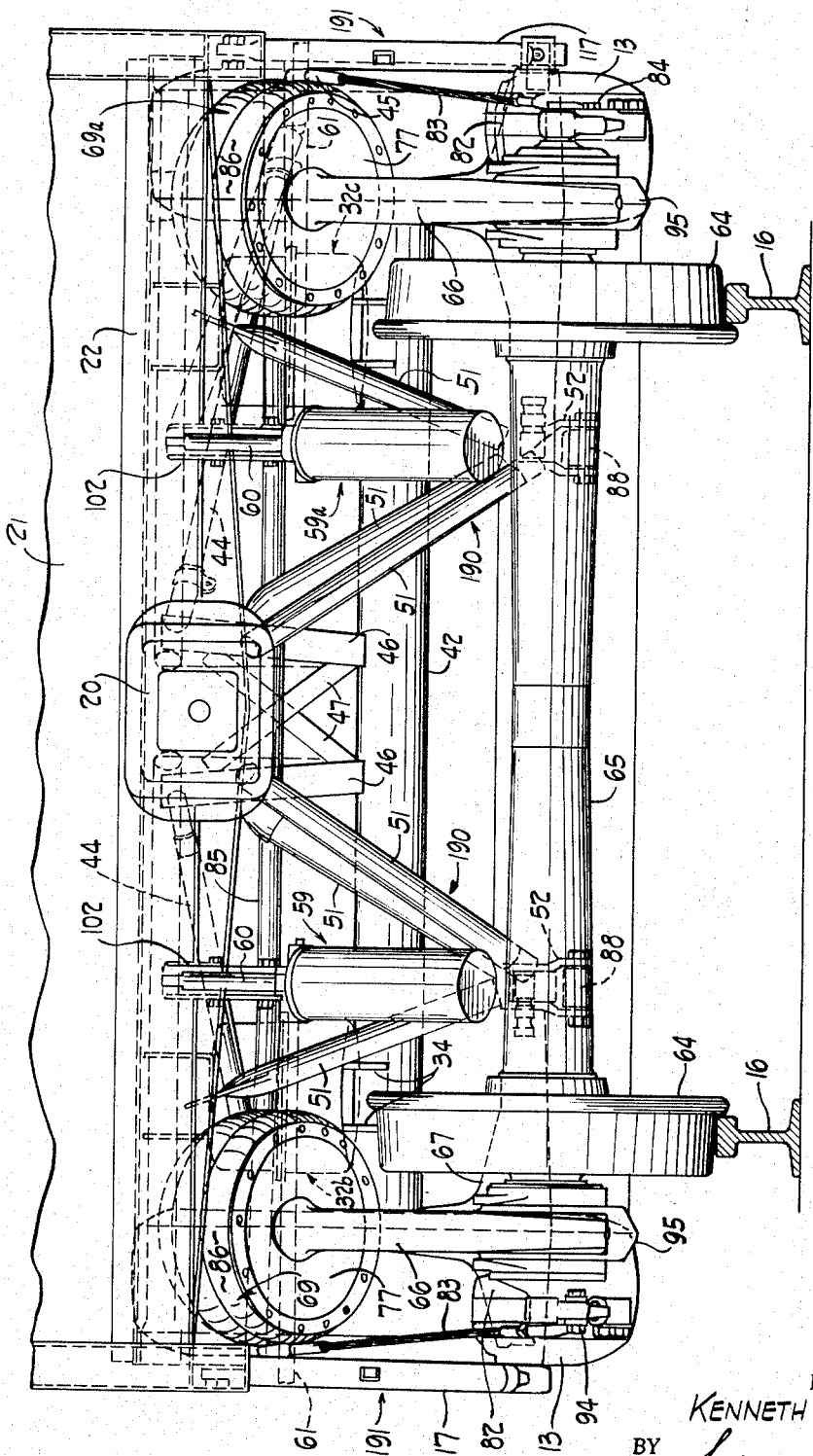
FIGURE 6 is a rear elevation of the vehicle with the body thereof broken away.

The road and rail wheel suspension unit 11 is connected to the frame assembly 22 through two laterally spaced sets of three anchor struts 51, each set defining a rigid inverted tripod 190 having an anchor block 52 at its lower end, as is seen most clearly in FIGURE 6; and two sets of dependent "V" brackets 191, spaced outwardly of the tripods 190, each set formed by a pair of upwardly divergent braces 116–117 whose lower ends are joined at an anchoring block 193 for engagement by the pivot 67 of a rail arm 66, and whose divergent upper ends are suitably secured to the outer side rails of frame 22, as is seen most clearly in FIGURE 4.

The rail wheelset 64 is similar in construction to that described in my co-pending application, Ser. No. 301,811, filed Aug. 13, 1963, entitled Railway-Highway Vehicle Truck, now Patent No. 3,286,657, issued Nov. 22, 1966, and, therefore, it will not be necessary to describe it here in other than general terms.

The wheelset 64 comprises rail wheels, of the conventional form, mounted on axle 65 having journal portions extending into journal boxes 95 at either of the ends thereof, which are secured to arms 66 by suitable hanger bars 192. The arms 66 have pivots 67 which are journaled in the anchor blocks 52 and 193 of the tripod units 190 and the "V" brackets 191, respectively.

The so mounted wheelset 64 is swingable on its arm pivots 67, for selectively moving the rail wheels to and from a lowered or load-carrying position.

Rail air spring means 69 and 69a are disposed between the vehicle frame 22 and the railset arms 66, which serve to both support and cushion the load on the railset 64.

The structural components of one of the rail air springs 69 are seen most clearly in FIGURE 11, and comprise a rubber air bellows 86 having upper and lower sealing beads 114 and 115, which are bolted to the rim edges of the upper and lower concave metal bells 72 and 77, respectively, by means of clamping rings 76 and 79.

Figure 5:
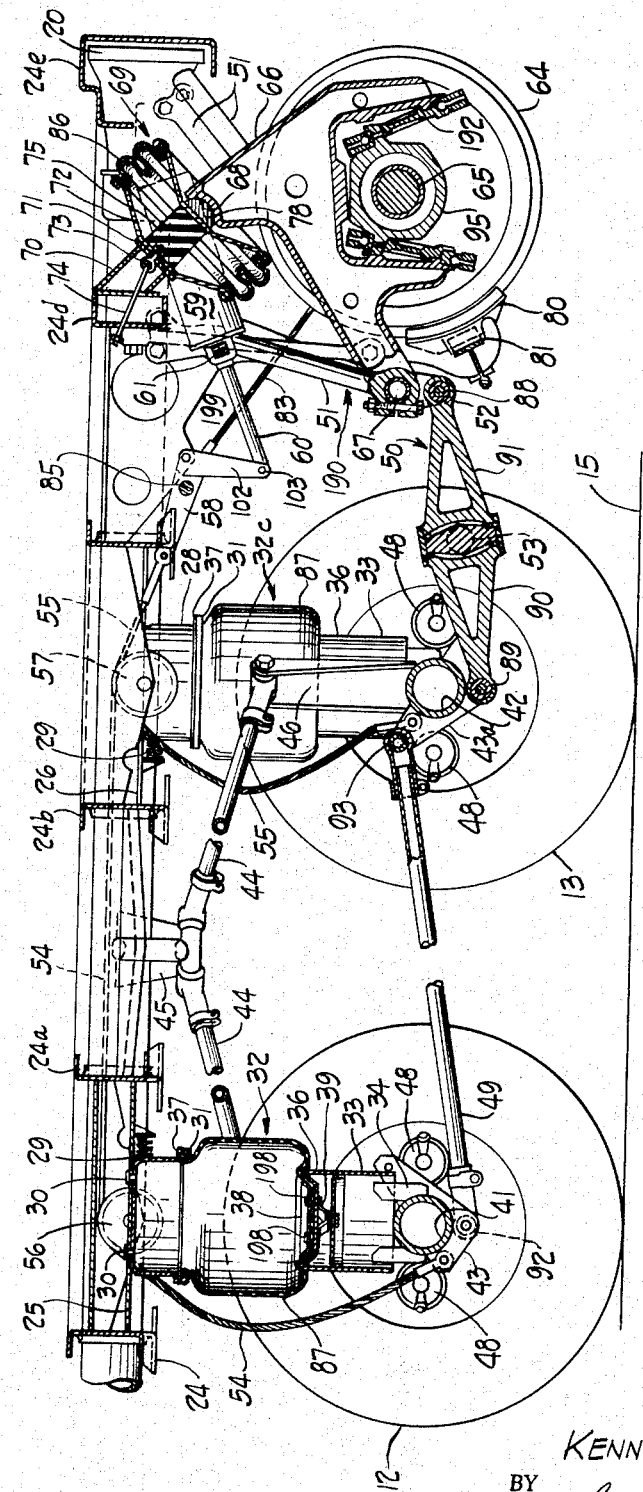
FIGURE 5 is a similar side elevation showing the wheel suspension unit in the same relative position as in FIGURE 1, but on a larger scale, taken along the line and in the direction of the arrows 5—5 of FIGURE 3.

The concave under surface of the lower bell 77 has a solid metal ball 78 centered therein which is adapted to seat in a ball socket 68 in the upper end of arm 66, as is seen most clearly in FIGURE 5.

The upper bell 72 is mounted on the end plate 71 of a bracket 70 welded to the frame cross-brace 24d, by means of a bolt 194 which engages a threaded metallic insert 195 in a hard rubber bumper 75.

The bolt 194 is engaged with a keeper link 74 through a universal joint, which upon rotation acts to draw up the bolt 194, to lock the upper bell 72 of the air spring 69 in place.

The weight of the vehicle body keeps the bell ball 78 nested in the rail arm socket 68. The concave undersurface of bell 77 acts to direct the ball 78 into the socket 68, thus automatically correcting any misalignment of the parts.

It will be seen that the rail air spring assemblies 69 and 69a may be easily installed or removed, without disassembly of the bellows units, by merely rotating the keeper link 74, with a wrench, to disengage the bolt 194 from the bumper unit 195, which leaves the entire air spring unit free to be lifted off the railset arm 66.

Brake mechanism is provided on the rail wheel arms 66 for cooperation with the rail wheels, and include conventional brake shoes 80, carried by a transversely extending brake beam 81, which are adapted to be pressed against the rims of the rail wheels by such brake beam. The brake mechanism also includes pneumatic power chambers 82 operable to move the brake beam 81 and its shoes in directions to either apply or release the braking faces of the shoes 80.

Reference numerals 41 and 42 indicate two longitudinally spaced and parallel highway axles, in tandem arrangement, which are connected to the frame 22 through two sets of paired air springs 32–32a and 32b–32c, as is seen in FIGURES 3 and 6. Air spring 32a which is mounted in paired relation with air spring 32, on axle 41, is not shown in the drawing due to lack of space.

The so mounted axles extend transversely of the frame 22, in spaced relation, forwardly of the rail wheelset 64.

Each axle 41 and 42 has a pair of conventional, pneumatic tired, highway wheels 12 and 13, respectively, journaled at the outer ends thereof. The wheels have the usual braking mechanism associated therewith, including air brake chambers 48, for actuating the brakes.

The axles 41 and 42 are maintained in fixed parallel relation by two transversely spaced torque links 49 which are pivotally anchored at their ends to torque link plates 43 and 43a, welded to axles 41 and 42, respectively, as seen in FIGURES 4 and 5. The plates 43 and 43a are of identical triangular shape and are so orientated on the axles that the forward end of the torque link 49 can be secured below the centerline of axle 41 to plate 43, and the rear end of torque link 49 secured above the centerline of axle 42, to plate 43a, by means of bolts 92 and 93 which pass through steel lined, resilient rubber bushings in plates 43 and 43a, respectively.

Two, transversely spaced, rigid torque arms 50 are pivotally connected, at their forward ends, to the plates 43a below the centerline of axle 42, and at their rear ends to the anchor blocks 52 of the tripods 190.

Figure 8:
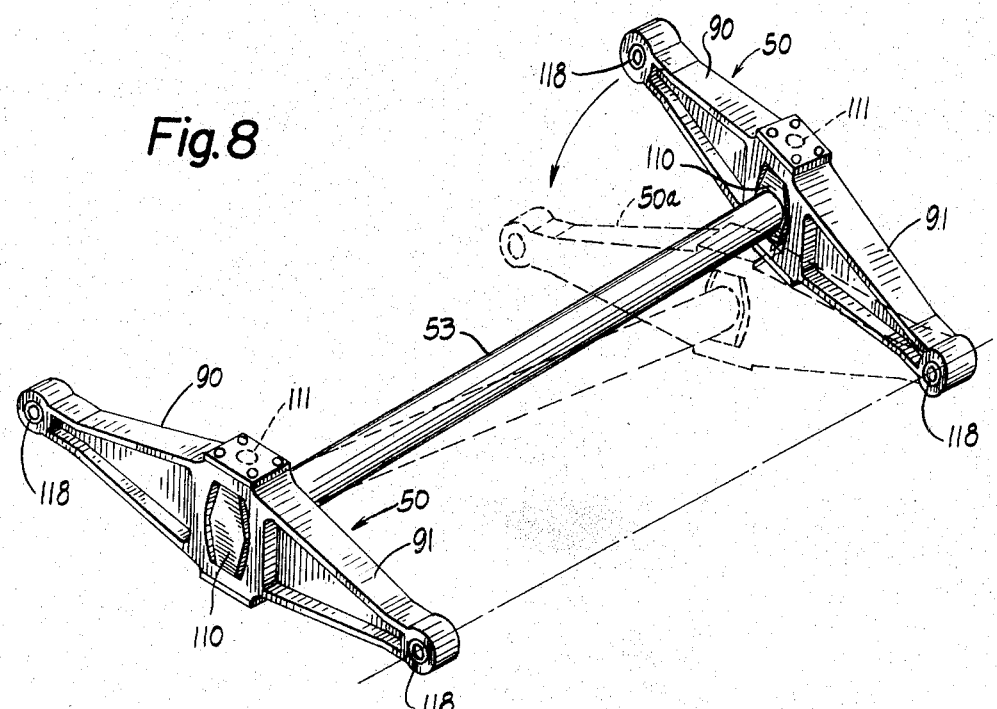
FIGURE 8 is a perspective view of the sway-dampener torque arm and torsion bar assembly of the sway control unit, showing it in alternate operating positions.

As seen most clearly in FIGURE 8 the torque arms 50 have the configuration of two triangular sections 90 and 91 with their bases opposed. Each section 90 and 91 has a steel lined resilient rubber bushing 118 at its apex. The torque arms 50 are joined in spaced relation, at their center points, through a torsion bar 53 having trunnions 110 at its ends, including pins 111 which swivelly engage the torque arms in a vertical plane, so that the torque arms are free for limited horizontal rotation, on the trunnion pins 111, but are held by the pins against rotation in a plane perpendicular to the long axis of the torsion bar 53.

The forward end of each torque arm 50 is pivotally anchored to the plates 43a by means of a bolt 89 through bushing 118, and the rear end is similarly anchored to the blocks 52 of the tripods 190, by means of a bolt 88.

The axles 41 and 42 are held against lateral movement by four stabilizer links 44. Reference numeral 46 indicates paired vertically extending arms welded proximate the center of each axle and spaced apart a distance such that they will clear the center sill 23 when the highway axles 41 and 42 are in the raised position shown in FIGURE 4. Each set of paired arms 46 is held rigid by crossed braces 47, as is seen most clearly in FIGURE 3.

Two opposed pivot castings 45 are mounted on opposite sides of the frame 22, centered between the axles 41 and 42. A stabilizer link 44 is pivotally mounted between each axle pivot arm 46 and the frame side pivot casting 45. The so anchored stabilizer links 44 permit vertical travel of the axles toward and away from the frame 22 but prevent any movement of the axles 41 and 42 crosswise of the frame 22. Thus, the so mounted highway axles 41 and 42 are restrained against lateral movement by the stabilizer links 44; are restrained against longitudinal movement by the cooperative action of the torque links 49 and the torque arms 50; and held against swaying by the reaction of the torsion bar 53.

By referring to FIGURE 8, it will be seen that if one of the torque arms 50 is pivoted downward to position 50a by reason of the sudden lowering of one end of its attached axle by the passage of the road wheel over a depression in the highway, the torsion bar 53 will be given a twist, which it resists, and as soon as the pressure is off, the torsion bar will react to raise the torque arm 50, and the road wheel proximate thereto, to their normal level position. Thus, the torsion bar 53 resists rotational moments during their occurrence, and then instantly reacts to regain its normal position as soon as the twisting moment ceases.

Furthermore, the manner of angularly connecting the ends of the stabilizing links 49 and the torque arms 50 to points above and below the centerlines of the axles 41 and 42 causes interplay of these elements that counteracts any tendency of either of the axles 41 or 42 to rotate when starting or stopping torques are applied to the highway wheels 12 and 13.

Figure 7:
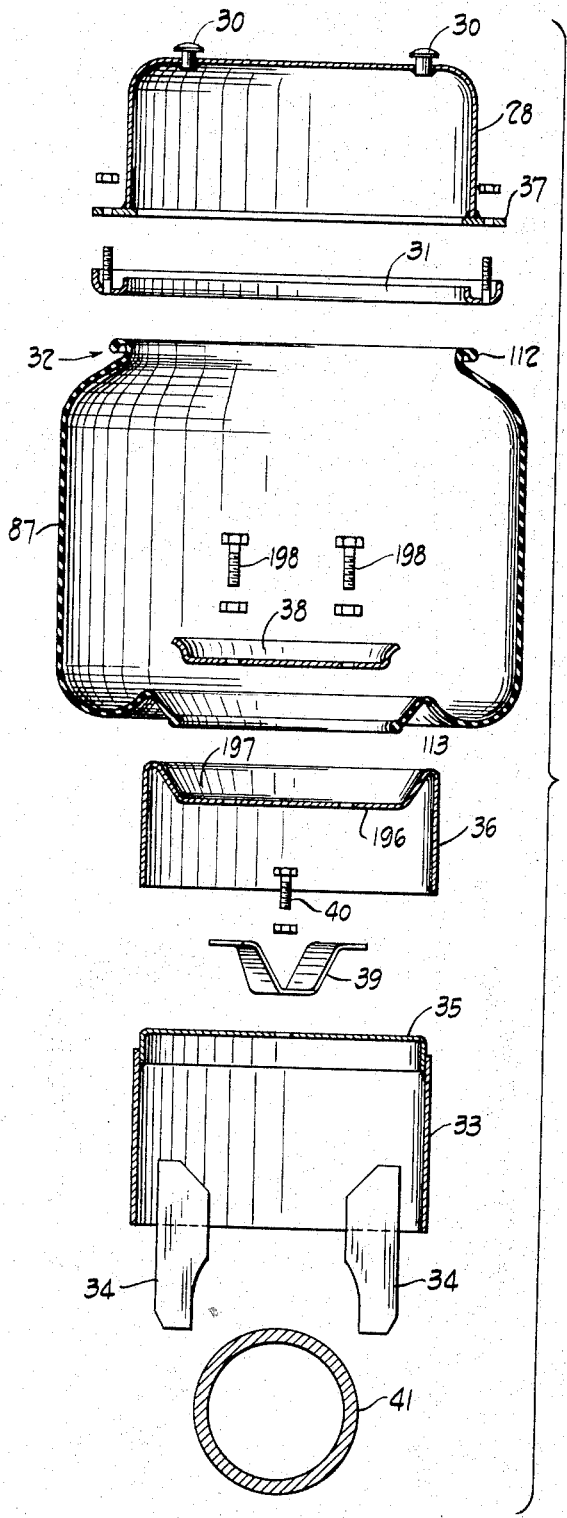
FIGURE 7 is an exploded sectional view of one of the road-axle air springs.
Figure 9:
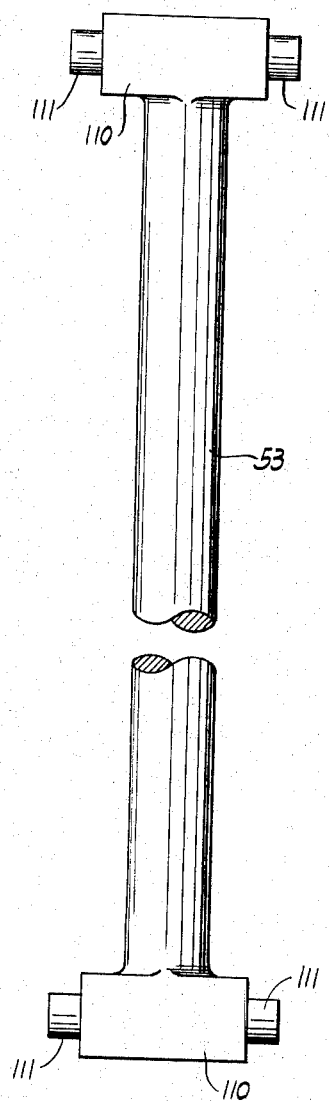
FIGURE 9 is a side elevation of the unmounted torsion bar of the sway-dampener assembly illustrated in FIGURE 8.

Again, the pivotal connection between the torque arms 50 and the torsion bar trunnions 110 permits slight pivoting of the parts, under excessive strain, that prevents permanent deformation of the torsion bar 53. The highway air spring assembly is shown in detail in FIGURE 7, broadly indicated by reference numeral 32. Each spring comprises a cylindrical pedestal 33 having mounting gussets 34 which are welded to the highway axles 41 and 42. The top of the pedestal 33 is closed by a cap 35 that is fitted inside the pedestal end to define a circumferential shoulder, thereat. A cylindrical piston 36 is adapted to be fitted over the cap 35 and seat against the shoulder. The piston has a depressed head portion 196 which defines an angularly inclined rim 197, therearound.

Reference numeral 87 indicates a flexible rubber invaginating sleeve having sealing beads 112 and 113, formed integral therewith, at its upper and lower ends, respectively.

A cylindrical bell 28 is open to the bottom, with an outwardly projecting circumferential flange 37, therearound. The bell 28 also has two diametrically spaced mounting buttons 30 projecting upwardly of the top face thereof. The bell 28 is mounted on the top end of the invaginating sleeve 87 by means of a clamping ring 31 that engages the sleeve bead 112 and holds it in pressed and sealed engagement with the flange 37, to which it is bolted. The lower bead 113 of the sleeve 87 is seated on the rim 197 of the piston 36 and pressed into sealed engagement therewith by means of clamping plate 38 which is held thereagainst by bolts 198 which pass through piston head 196 and anchor a bracket 39 to the underside thereof, as seen in FIGURE 5. The sleeve 87 with the bell 28 and the piston 36 so engaged therewith forms a gas-tight unit that is easily fitted over and mounted on the pedestal cap 35 by means of a single bolt 40, that anchors the bracket 39 to the cap 35, as again seen in FIGURE 5.

The bell 28 is connected to the vehicle frame 22 through a slotted support plate welded between the cross bearers of the frame. In FIGURE 3, two of such support plates, identified by reference numerals 25 and 26, are shown. Support plate 25 extends between cross bearers 24 and 24a, across the centerline of highway axle 41, and support plate 26 extends between cross bearers 24b and 24c, across the centerline of highway axle 42. Each support plate has two longitudinally spaced and aligned slots 27 having circular cutouts 109 at one end thereof, of a diameter such that the bell mounting buttons 30 can be inserted therethrough and slid longitudinally of the slots 27 to lock the bell 28 to the support plate. Reference numeral 29 indicates a bell holding helical spring removably mounted on the underside of the support plate, adjacent one of the circular cut-outs 109, and adapted to press against the side of the mounted bell 28 to urge its mounting buttons 30 away from the cut-outs 109 to the far end of the slots 27. The length of the helical spring 29 is such that in its fully compressed condition, it will not permit the bell mounting buttons 30 to become aligned with the cut-outs 109 for passage therethrough, and thus, it is not possible to accidentally disengage the bell 28 when the spring 29 is in place.

In order to disengage the bell 28 from the support plate, the bell 28 must be pushed lengthwise of the slots 27 until the mounting buttons 30 are located at the ends of the slots 27 most distant from the cut-outs 109. The expanded spring 29 is then removed, thus leaving the bell free for movement along the slots until the buttons 30 can be aligned with the cut-outs 109 and lowered therethrough.

Conversely, when the bell is to be mounted, the aforesaid steps are reversed.

This method of mounting the highway air springs 32 permits limited longitudinal movement of the spring bells 28, which is necessary when the highway axles are in their raised position, as seen in FIGURE 4, since the rear highway axle 42 must move in a slightly arcuate path, which requires that the air spring unit 32b be free to shift slightly rearward, to prevent distortion of the bell 28. At the same time, the flexible character of the invaginating sleeve 87 allows the pedestal 33 to assume a titled position within the infolded sleeve.

The infolding of the sleeve 87, upon itself and the nesting of the piston 36 within the bell 28, as seen in the collapsed air spring, identified by reference numeral 32 in FIGURE 4, provides an air spring unit whose overall inflated length is more than twice its overall collapsed length, thereby providing safe clearance for the raised highway wheels 12 and 13 when the vehicle is operating on its rail wheelset 64, without requiring the frame to be maintained at a height that would make the vehicle top-heavy when running on rails.

The highway or rail air springs are selectively inflated or deflated, by a unique valving system to be described hereinafter, to permit operation either on the highway or on rails.

Referring to FIGURE 4, it will be seen that when the vehicle is operating on rails 16, the air springs 69 of the rail wheelset 64 are inflated while the highway air springs 32 are deflated, with their sleeves 87 invaginated, to permit road wheels 12 and 13 to be raised against the underside of frame 22, clear of the rails 16.

When operating on the highway, as seen in FIGURE 5, the highway axle air springs 32 are inflated and the rail wheelset air springs 69 deflated, with their bellows 86 collapsed, and the rail wheelset 64 pivoted clear of the highway 15.

Flexible retractor cables 54 and 55 are anchored at one end to the torque link plates 43 and 43a, of highway axles 41 and 42, respectively, and anchored at their other ends to retractor arms 58 of retractor arm shaft 85, after traveling over sheaves 56 and 57, as seen most clearly in FIGURE 4. Similar flexible cables 83 are anchored at one end to the journal box cover extension 94 of the rail wheelset 64 and at their other ends to retractor arms 84 of the retractor arm shaft 85.

Figure 10:
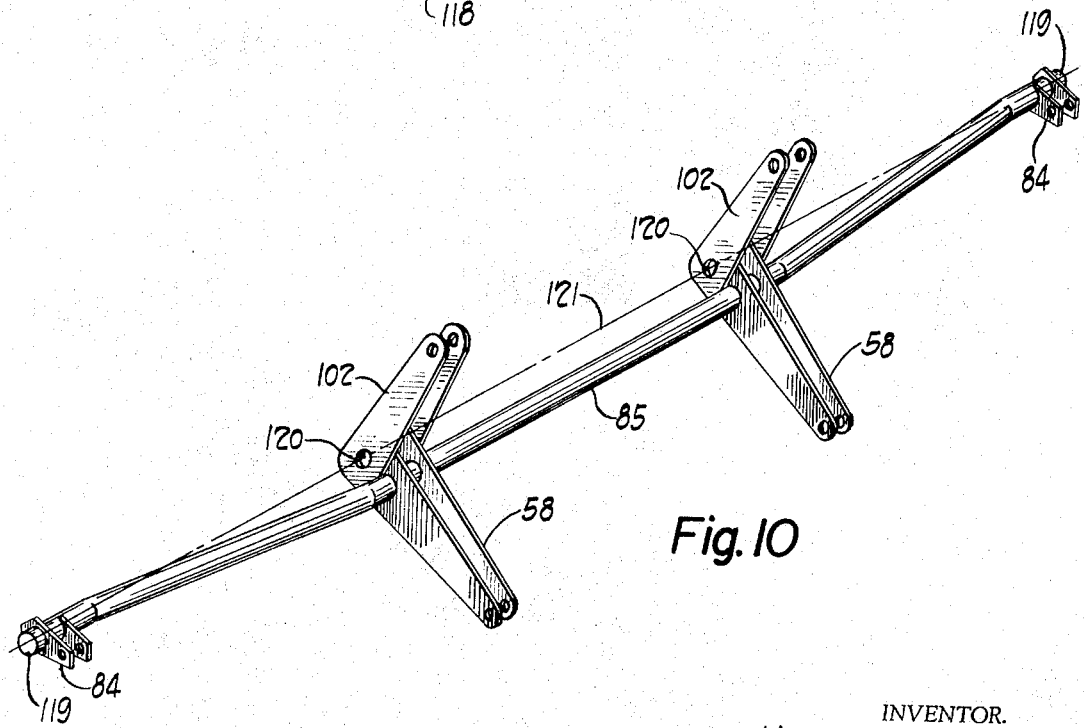
FIGURE 10 is a perspective view of the retractor arm shaft, in its unmounted condition.

Referring to FIGURE 10, it will be seen that two crank arms 102 are mounted on projections of the arms 58, at 90° thereto. It will be noted that the shaft 85 is offset along its central portion for the purpose of clearing other structural elements.

The end bearings 119 of the shaft 85 are aligned with a center of rotation, 121, which passes through bearing bores 120 in crank arms 102. The shaft 85 is mounted transversely of the frame 22 with its end bearings 119 journaled in dependent bearing plates 199 positioned on opposite sides of the frame 22. The shaft 85 is further supported by brackets, not shown, having bearing pins which pass through the crank arm bores 120.

It will be seen that the road axle cable arms 58 and the rail wheelset cable arms 84 project in the same direction, but are of unequal length. This is due to the fact that the highway axle retraction cables 54 and 55 must travel a greater distance to lift the highway axles to their inoperative position than that required by the rail axle cables 83 to pivot the rail wheelset 64 to its inoperative position.

Two identical retractor units 59 and 59a are pivotally mounted on brackets 100, rearwardly of the shaft 85, with operating piston rods 60 connected to the crank arms 102, as is seen in FIGURES 6, 12 and 14.

The construction of the retractor units 59 is best understood by referring to FIGURES 14, 15, 16 and 17.

The retractor unit 59 comprises a cylinder 96 having a closure head 97 including a piston rod sleeve 98 formed integral therewith. The head end of the cylinder is pivotally secured to a bracket 100 by means of trunnion pins 99, which are engaged in bracket bushings 101.

The head 97 has a pocket 107 in its side facing the side brace 116. A built-up flat-leafed, laterally extending, elongated trunnion torsion spring 61 has one end secured in the head pocket 107 by means of a bolt 108, while the other end is fitted through a square hole, 200, in the side brace 116, as seen in FIGURES 3, 6, 12 and 13.

A piston rod 60 is mounted in the sleeve 98, for reciprocal movement therethrough.

A second cylindrical sleeve 104, of a diameter large enough to fit over the piston rod sleeve 98 is co-axially anchored to the inner end of the piston rod 60 through its end wall 105. A piston head 62 is mounted at the other end of the sleeve 104. The head 62 has a sealing ring 201 that provides a gas-tight seal between the cylinder wall 96 and the head 62.

Reference numeral 63 indicates a double-coil helical toggle spring positioned within cylinder 96 between the piston head 62 and the cylinder end wall 202.

Figure 21:
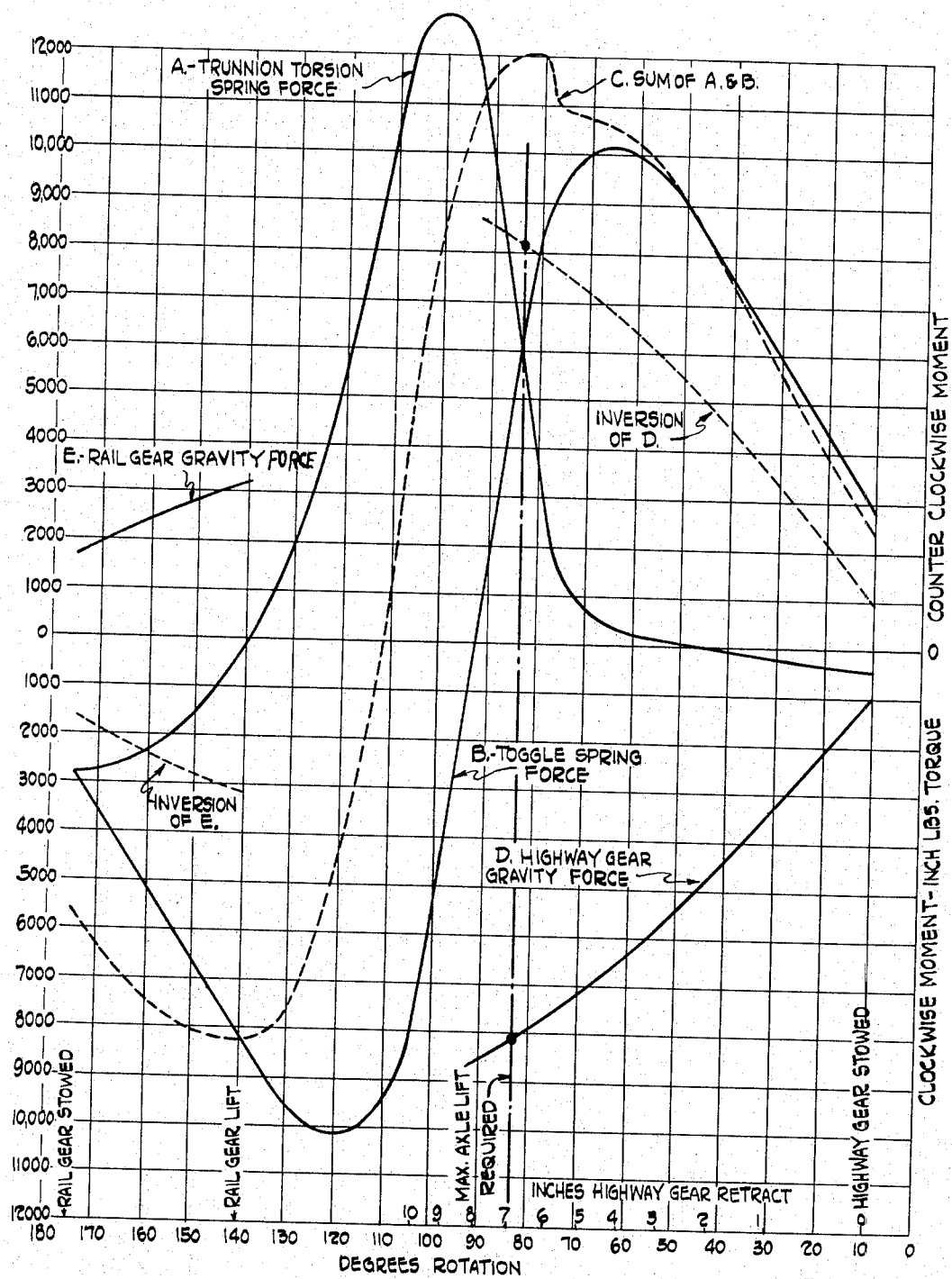
FIGURE 21 is a graph showing the rotational moments about the axis of the retractor arm shaft effective during the various transfer movements from "Highway" to "Rail" operation, and vice-versa.

The physical characteristics of the toggle spring 63 and the torsion spring 61 are calculated to provide adequate rotational moments about the axis of the retractor arm shaft 85, expressed in values of inch-pounds of torque in either counter-clockwise or clockwise direction, to do the work required to lift and stow the highway running gear or the rail running gear, respectively, as graphically disdisplayed in FIGURE 21.

Reference character A indicates the curve of the force exerted by trunnion torsion spring 61, in inch lbs. of torque.

Reference character B indicates the curve of the force exerted by toggle spring 63, in inch lbs. of torque.

Curve C indicates the sum of curves A and B, in inch lbs. of torque.

Curve D indicates the highway gear gravity force, in inch lbs. of torque.

Curve E indicates the rail gear gravity force, in inch lbs. of torque.

The left side of the graph represents the retractor arm shaft 85 in the rail retract and highway running position.

The right side of the graph represents the retractor arm shaft 85 in the highway retract and rail running position.

In any position of rotation of the retractor arm shaft 85 the combined forces of rotation, represented by curve C, supplied by the toggle spring 63 and the trunnion torsion spring 61 are more than sufficient to lift either the highway or rail running gear off the ground and stow the unused wheel system. At the stowed position of either the highway or rail running gear, the toggle spring 63 is the major contributor to the stowing force of either running gear, as seen at the right and left sides of the graph.

The graph also shows that while the combined forces, C, of the toggle and torsion springs are required to lift the highway running gear off the ground, the force, B, of the toggle spring, alone, is sufficient to lift the rail running gear off the ground, without the help of the torsion spring 61.

The torsion spring force, necessary to aid in lifting the highway running gear, is generated by the inflation of the highway air bags, when transferring from rail to highway operation.

Compressed air is admitted to or exhausted from the cylinder through duct 106. The free end of the piston rod 60 is connected to the crank arm 102 by means of a clevis pin 103, as seen in FIGURE 14.

The toggle spring 63 is normally in the expanded condition, seen in FIGURE 14, to maintain the piston rod 60 in its fully extended condition, as seen in FIGURE 12, wherein the vehicle is operational for travel on rails, or in FIGURE 13, wherein the vehicle is operational for travel on the highway, as to be explained, hereinafter.

During the period when the vehicle is being transferred from one set of wheels to the other, the spring 63 must be neutralized to permit the piston rod to be fully retracted into the cylinder 96, as seen in FIGURE 15.

This is effected by introducing compressed air through duct 106 into the cylinder 96, to the left of the cylinder head 62, which is then pressed toward the right to compress the toggle spring 63 and pull the piston rod into the cylinder. With the spring, 63, so neutralized the retractor unit 59 is free to flip, aided by the reaction of the trunnion torsion spring 61, between the downwardly or upwardly inclined positions illustrated in FIGURES 5 and 13 or 4 and 12, respectively, depending upon which way the transfer is being made.

The transfer from road to rail, or vice versa, and the retraction and stowing of the inoperative portion of the running gear is effected solely by the selective distribution of compressed air between the various air springs and retractor cylinders. No motors or mechanical gear trains are required, and the entire operation is automatically effected by the movement of a single control handle, between three positions. However, the terminal stowing force is supplied by the springs 63 and 61, alone, and not by air pressure, thereby providing "fail-safe" construction.

Referring again to FIGURES 12 and 13 it will be seen that the cooperating elements of the transfer mechanism are never at dead center when the running gear is in its stowed position, so that the parts will not be distorted when subjected to momentary excessive strains, under which conditions the retractor cylinder toggle springs 63 also serve as emergency cushioning means.

Figure 18:
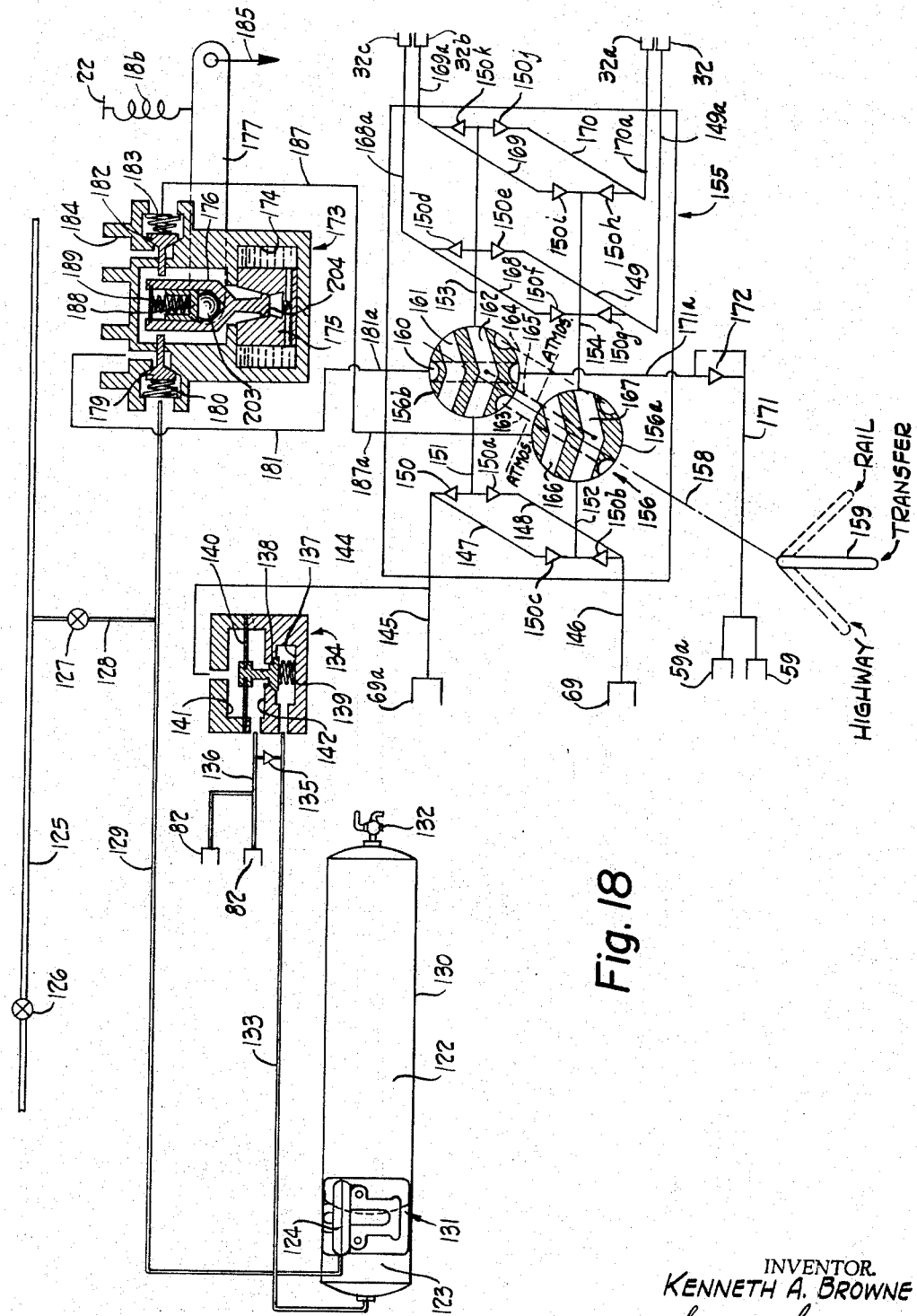
FIGURE 18 is a schematic layout of the entire pneumatic control system, showing the transfer control valve at "transfer" position.

A schematic view of the pneumatic control system, referred to above, is set forth in FIGURES 18, 19 and 20.

In FIGURE 18 reference numeral 155 broadly indicates a transfer control valve which sets up the sequential delivery or release of compressed air to or from the highway axle air springs 32, 32a, 32b and 32c; the rail axle air springs 69 and 69a; and the retractor units 59 and 59a.

The valve body has a two level, three-way, plug 156 mounted therein for angular rotation between three positions identified as "Highway"- "Transfer"- and "Rail," by means of an operating handle 159 connected to the plug shaft 158.

The first plug level, identified by reference numeral 156a is the "air exhaust" section and has two "V" bores 166 and 167 extending crosswise of the plug axis 158.

The second plug level, identified by reference numeral 156b is the "air-delivery" section and has two "V" bores 161 and 162 extending crosswise of the plug axis 158. An axial bore 165 connects bores 162 and 167. Two grooves 163 and 164 in the plug surface extend between levels 156a and 156b, parallel to the plug axis 158, with their mid-points connected to the atmosphere.

Reference numeral 160 indicates a diametric angular bore, in plug level 156b, which is shaped to avoid bores 161 and 162.

In the body of the transfer control valve, adjacent the rotatable plug 156, and spaced therefrom, are 12 check valves, identified by reference numerals 150 and 150a to 150k, inclusive. These check valves are of the conventional ball and seat type which permit air flow in only one direction. In FIGURE 18 the check valves are portrayed as triangles which allow air flow through their bases but block air from entering their apices.

The check valves are connected to the several plug bores 161, 162, 166 and 167 by ducts 151, 152, 153, and 154, having openings in the wall of the body bore in which the plug 156 rotates and with which the plug passages may be made to line up in three combinations, as seen in FIGURES 18, 19 and 20.

The "flow" sides of check valves 150 and 150a are connected to duct 151.

The "no-flow" sides of check valves 150b and 150c are connected to duct 152.

The "flow" sides of check valves 150d, 150e, 150k and 150j are connected to duct 153.

The "no-flow" sides of check valves 150f, 150g, 150h and 150i are connected to duct 154.

In addition the check valves are connected by cross ducts as follows:

The "no-flow" side of check valve 150 is connected to the "flow" side of check valve 150c by duct 147.

Duct 148 connects the "no-flow" side of check valve 150a to the "flow" side of check valve 150b.

Duct 149 connects the "no-flow" side of check valve 150e to the "flow" side of valve 150g.

Duct 168 connects the "no-flow" side of check valve 150d to the "flow" side of check valve 150f.

Duct 169 connects the "no-flow" side of check valve 150k with the "flow" side of valve 150i.

Duct 170 connects the "no-flow" side of valve 150j with the "flow" side of valve 150h.

It will be noted that the so-connected check valves automatically isolate a ruptured air spring and prevent back flow of air from any inflated load-supporting spring into the damaged spring, which is a safety feature.

Reference numeral 181a indicates a duct for connection to a source of compressed air and so positioned in the valve body as to be alignable with the plug bores 160 or 161 depending upon the setting of plug 156, as seen in FIGURES 18, 19 or 20.

A duct 187a for connection to the atmosphere is alignable with plug bore 166 when the control valve plug 156 is in either of the positions illustrated in FIGURES 19 or 20.

A duct 171a is alignable with plug bore 160 or plug grooves 163 and 164, depending upon the setting of plug 156 as seen in FIGURES 18, 19 or 20.

Duct 147 is connected to Rail Air Spring 69a through pipe line 145.

Duct 148 is connected to Rail Air Spring 69 through pipe line 146.

Duct 149 is connected to Highway Air Spring 32 through pipe line 149a.

Duct 170 is connected to Highway Air Spring 32a through pipe line 170a.

Duct 169 is connected to Highway Air Spring 32b through pipe line 169a.

Duct 168 is connected to Highway Air Spring 32c through pipe line 168a.

Reference numeral 173 indicates a vehicle frame leveling valve, adapted to meter compressed air in or out of the highway and rail axle air springs to maintain the vehicle frame 22 at a predetermined height above the running axles, regardless of the weight of the load being transported.

A control lever 177 acts to alternately tilt a fork 176 against the operating stems of compressed air inlet valve 179, or air release valve 182, positioned on opposite sides of the fork 176, and normally biased to their closed positions by valve springs 180 and 183, respectively.

The fork 176 is engaged by lever 177 through a clutch shaft 203 having a flat cam surface engaged by a cam follower 188 biased thereagainst by spring 189. The clutch provides for slippage between the shaft 203 and lever 177 after the fork 176 has fully opened either valve. Tail 204 of fork 176 is pivotally engaged in a damping piston 175 mounted for reciprocation in an oil filled damping cavity 174.

The leveling valve 173 is mounted on the vehicle frame with its control lever 177 normally held in a horizontal position, whereat the fork 176 is centered between the operating stems of valves 179 and 182. A tension spring 186 connected between the lever 177 and the frame 22 acts to bias the lever upward to tilt the fork 176 against the valve 179, to move it to its open position when the frame 22 is lower than a predetermined height.

A cable 185 connects the control lever 177 to both the highway and rail axles through a suitable harness, not shown. The length of cable 185 is such that it will pull the control lever 177 downward, against the upward pull the spring 182, to hold the lever horizontal when the vehicle frame 22 is at a predetermined height, and further, acts to pivot the lever downward to tilt the fork 176 against the stem of valve 182 to open same, when the height of the vehicle frame exceeds the predetermined level.

The outlet side of leveler compressed air valve 179 is connected through pipe line 181 to duct 181a.

The inlet side of leveler air exhaust valve 182 is connected through pipe line 187 to duct 187a.

The two retractor units 59 and 59a are connected to duct 171a through pipe line 171, which has a slow relief check valve 172.

Reference numeral 125 indicates the brake pipe of the vehicle which is connected to the brake air compressor located in the engine that pulls the vehicle when it is operating on rails, or to the brake air compressor system of a tractor when operating on the highway.

A ball end valve 126 is in the line 125.

The brake pipe 125 is connected to air line 129 through line 128, which has a cut-out cock 127.

Air line 129 is connected to the inlet side of leveler compressed air valve 179, and also to the rail brake triple valve 124 of compressed air reservoir 130.

The reservoir 130 is divided, by an inner diaphragm 131, into an auxiliary reservoir chamber 122 and a brake cylinder equalizing volume chamber 123.

The chamber 122 has a drain cock 132.

Pipe line 133 connects equalizing chamber 123 to a brake load limiting valve 134 which is in turn connected to the rail wheelset brake chambers 82 by pipe line 136. Lines 133 and 136 are cross-connected by a check valve 135 which bypasses the load limiting valve 134.

The function of the valve 134 is to vary the maximum air pressure deliverable to the brake chambers 82 in proportion to the air pressure in the rail axle air springs 69 and 69a, which is, in turn, proportioned to the load being carried, as is automatically determined by the operation of the load leveling valve 173.

Thus, locking and sliding of the rail wheels is prevented when light loads are being carried, while providing adequate braking pressure for heavy loads.

The load limiting valve 134 has an inlet chamber 137 and an outlet chamber 142 connected through a valve 138 whose stem is mounted on a pressure-responsive diaphragm 140 which form a closure wall for control chamber 141 which is connected by pipe line 144 to the air supply line 145 of rail axle air spring 69a. The amount of braking pressure capable of being built up in the line 136 for operating the brake chambers 82 is proportionate to the pressure in chamber 141 behind diaphragm 140, which when equalized by the pressure in the line 136 and chamber 142 causes the valve 138 to be closed by spring 139. The pressure in chamber 141 is the same as that in rail axle air springs 69a and 69. The rail braking pressure may be directly proportional to the rail axle air spring pressure, or may be made any desired ratio thereto.

When the Roadrailer is set for operation either on the highway as seen in FIGURE 1, or on rails, as seen in FIGURE 2, it may be automatically converted for opposite operation by positioning the operating handle 159, of transfer control valve 155, on "Transfer," as seen in FIGURE 18.

The following connections between the air lines leading to the various air springs will be automatically set up, causing equalization of the air pressure in all the air springs:

Air from the rail axle air spring 69a will flow along the path of line 145, duct 147, check valve 150c into duct 152. At the same time, air from rail axle air spring 69 will flow through line 146, check valve 150b into duct 152. From duct 152 the flow is into plug bore 167, axial bore 165 to bore 162 through duct 153, check valve 150d, duct 168, line 168a to highway axle air spring 32c; also through check valve 150k, duct 169 and line 169a to highway axle air spring 32b. Air in duct 153 also flows through check valves 150e and 150j, through ducts 149 and 170, through lines 149a and 170a to highway axle air springs 32 and 32a, respectively. It will also be observed that air from the highway axle air springs 32, 32a, 32b and 32c is also free to flow through check valves 150f, 150g, 150h and 150i into duct 154, into plug bore 167, through axial bore 165 to bore 162 and into duct 151, through check valves 150 and 150a, back to the rail axle air springs 69 and 69a. Thus the air pressure in the rail and highway axle air springs is equalized in both directions.

Equalization of the air springs will cause the level of the vehicle frame 22 to lower.

Slackening of axle cable 185 will permit the control lever 177, of leveling valve 173, to be pivoted upward by spring 186, which causes the valve 179 to be opened, by the resultant tilting of fork 176 thereagainst.

Compressed air is then free to flow from valve 179 through pipe line 181, duct 181a, plug bore 160, duct 171a, check valve 172 and pipe line 171 to the transfer units 59 and 59a. Compressed air entering the cylinders 96 will force the piston heads 62 to take the position illustrated in FIGURE 15 wherein the piston rods 60 are fully retracted and the springs 63 neutralized. Upon retraction of the piston rods 60, the crank arms 102 of retractor arm shaft 85 will be rotated to an intermediate position wherein the axle cables 54, 55 and 83 attached to retractor arms 58 and 84 will become slack, permitting their attached axles to drop to the ground under the force of gravity.

At the conclusion of this cycle, the transfer control handle 159 may be moved to the positioned identified as "Highway" in FIGURE 19, to activate the highway wheels and stow the rail wheels, as in FIGURE 5; or it may be moved to the position identified as "Rail" in FIGURE 20, to activate the rail wheels and stow the highway wheels, as seen in FIGURE 4.

With the handle 159 positioned at "Highway" the transfer control valve plug 156 has the position shown in FIGURE 19, wherein the various bores and ducts of valve 155 are aligned as follows:

Ducts 151 and 152 from the rail air springs 69 and 69a are aligned with plug groove 163, thus venting their bellows 86 to the atmosphere and permitting complete collapse of the bellows.

Duct 171a connected to the cylinders 96 of retractor units 59 and 59a is aligned with plug groove 164 which vents to the atmosphere. Retractor units 59 are flipped to their downwardly inclined position by torsion springs 61, as seen in FIGURE 13. Air from cylinder 96 is slowly vented to the atmosphere, backwards through the slow relief orifice of check valve 172, permitting the springs 63 to expand and push piston rods 60 to the extended position shown in FIGURE 13. The outward thrust of piston rods 60, acting through crank arms 102, imparts clock-wise moments of rotation to the retractor shaft 85 which, in turn, causes travel of the retractor shaft arms 58 and 84 in a clock-wise direction to a position wherein these arms extend forwardly. The clock-wise movement of the retractor shaft arms 84 causes their attached cables 83 to pivot the rail wheelset 64 upward and retain it in the stowed position seen in FIGURE 5; at the same time the forwardly extending position of retractor shaft arms 58 leaves the highway axle cables, 54 and 55, slack.

Compressed air duct 181a is connected to all the highway air spring invaginating sleeves 87 through plug bore 161 and air delivery duct 153.

Plug bore 166 is aligned with air exhaust duct 187a and highway axle air spring exhaust air duct 154.

As noted above, at the end of the air spring pressure equalizing cycle, the vehicle frame level is below the predetermined height and therefore the leveling valve lever 177 is in its upwardly inclined position wherein the compressed air delivery valve 179 is open. Compressed air will therefore pass into duct 181a, from pipe line 181, to inflate the highway axle air springs and raise the frame 22 to the predetermined level. At that point the lever 177 will be horizontal and the delivery valve 179 closed. If too much air is admitted, and the level of the frame 22 raised above the predetermined height, lever 177 will pivot downward to open air release valve 182. Air will then pass from duct 187a through pipe line 187 and escape from the exhaust side 184 of valve 182.

Again if the load carried in the vehicle should be increased or decreased, thus causing a fall or rise in the level of frame 22, the resultant upward or downward pivoting of the lever 177 will cause air to be admitted or released from the invaginating sleeves 87 of the air springs 32, 32a, 32b and 32c; in a volume calculated to maintain the predetermined level.

Thus for highway operation, the cushioning of the load will be automatically proportioned to its weight and provide substantially constant riding conditions whether the vehicle is empty or loaded to its maximum capacity.

With the handle 159 positioned at "Rail" the plug 156 has the position shown in FIGURE 20, wherein the various bores and ducts of the valve 155 are aligned as follows:

Ducts 153 and 154 connected to the highway axle air springs 32, 32a, 32b and 32c are aligned with plug groove 164, thus venting their invaginating sleeves 87 to the atmosphere and permitting complete deflation of the sleeves 87.

Duct 171a leading to retractor unit cylinders 96 is aligned with plug grooves 163, permitting the cylinders 96 to be vented to the atmosphere as described hereinabove. The retractor units 59 are flipped by torsion spring 61 to the upwardly inclined position, seen in FIGURE 12. In this position the outward thrust of piston rods 60, acting through crank arms 102, imparts counter-clockwise moments of rotation to the retractor shaft 85 which, in turn, causes travel of retractor arms 58 and 84 in a counter-clockwise direction to a position wherein the arms extend rearwardly. The counter-clockwise movement of the retractor shaft arms 58 causes cables 54 and 55 to be pulled rearwardly to lift and stow the highway axles 41 and 42; at the same time the rearwardly extending position of the retractor shaft arms 84, associated with cables 83 allows these cables to remain slack, leaving the rail wheelset free to travel on rails 16, as seen in FIGURE 4.

Air delivery duct 151 is connected through plug bore 161 to compressed air duct 181a, and the air exhaust duct 152 is connected through plug bore 166 to exhaust duct 187a, Compressed air is then delivered or exhausted from the rail air spring bellows 86 by the leveling valve 173, in the manner described above, until the air springs bring the vehicle frame 22 to the predetermined level and maintain it thereat under all operating conditions, as set forth heretofore.

It is to be understood that the assembly of the forward set of road wheels 12 could be omitted from the vehicle, if it were intended for operation on the highway with light loads only; however, this would limit the versatility of the vehicle.

It will now be clear that there has been provided a Road-Rail Vehicle which accomplishes the objectives heretofore set forth.

While the invention has been disclosed in its preferred form, it is to be understood that the specific embodiment thereof, as described and illustrated herein, is not to be considered in a limited sense as there may be other forms or modifications of the invention which should also be construed to come within the scope of the appended claims.

I claim:

1. In a road-rail vehicle, a frame structure having transversely spaced and dependent bracket means; laterally spaced and paired sets of dependent air-springs, individually mounted on the frame and spaced apart horizontally in a direction lengthwise of the vehicle; transversely extending road and rail wheel-set axle means pivotally anchored on the bracket means and individually engaged by a set of the paired air-springs; a source of compressed air; valving means for selectively inflating or deflating the road and rail air-springs in alternate sequence; and, axle retracting means mounted on the frame, connected to both the road and rail wheel-set axles, and operable to maintain either the road or rail wheel-set axles in a raised and stowed position, when their associated set of paired air-springs is in a deflated condition.

2. In a road-rail vehicle, a frame structure having a first pair of dependent, inboard, struts spaced apart laterally in a direction transversely of the vehicle; a second pair of dependent, outboard, brackets aligned with and spaced outwardly of said struts; rail wheel-set axle support arms pivotally mounted between each strut and bracket, projecting rearwardly thereof, and adapted to support a rail wheel-set axle therebetween; air-springs mounted on the frame above each of the arms and engaged with said arms rearwardly of their pivot points; forward and rear, road wheel-set axles arranged in tandem and mounted, through air-springs, transversely of the underside of the frame, forwardly of the struts; the rear axle in the tandem being pivotally connected to the two struts through two transversely spaced torque arms, cross connected at their mid-points through a torsion bar; a source of compressed air; an air distribution system inter-connecting the several air-springs, including valving means for selectively inflating and deflating the road wheel-set and rail wheel-set axle air-springs in alternate sequence; and wheel-set axle retracting means mounted on the frame, connected to both the road and rail wheel-set axles, operable to raise and maintain either the road or rail wheel-set axles in a stowed position when their associated air-springs are in a deflated condition, leaving the other wheel-set free to engage a traction surface.

3. A road-rail vehicle, as defined in claim 2, in which the torque arms are pivotally connected to the rear road wheel-set axle below its center-line.

4. A road-rail vehicle, as defined in claim 2, in which each inboard strut comprises three tubular braces secured at their upper ends to the vehicle frame in spaced triangular relation, and joined at their lower ends through an anchor block, to define a dependent inverted tripod.

5. A road-rail vehicle, as defined in claim 2, having two transversely spaced and parallel torque links, pivotally connected to the tandem forward axle below its center-line and to the tandem rear axle above its center-line; and, two pair of oppositely disposed stabilizer links, one pair for each of said axles, pivotally connected at their inner ends to the axles proximate their centers, and pivotally connected at their outer ends to opposite sides of the vehicle frame.

6. In a road-rail vehicle, a frame structure having a first pair of dependent, inboard, struts spaced apart laterally in a direction transversely of the vehicle; a second pair of dependent, outboard, brackets aligned with and spaced outwardly of said struts; rail wheel-set axle support arms pivotally mounted between each strut and bracket, projecting rearwardly thereof, and adapted to support a rail wheel-set axle therebetween; air-springs mounted on the frame above each of the arms and engaged with said arms rearwardly of their pivot points; forward and rear, road wheel-set axles arranged in tandem and mounted, through air-springs, transversely of the underside of the frame, forwardly of the struts; the rear axle in the tandem being pivotally connected to the two struts through two transversely spaced torque arms, cross-connected at their mid-points through a torsion bar; a source of compressed air; an air distributing system inter-connecting the several air-springs and including valving means for selectively inflating or deflating the road wheel-set axles air-springs and the rail wheel-set axle air-springs in alternate sequence, when their associated wheel-set axles are in load-bearing or non-load-bearing positions, respectively; and, axle retractor means, comprising, a retractor shaft journaled transversely of the frame on dependent, spaced and aligned bearing plates positioned forwardly of the struts and brackets; first and second pairs of spaced retractor arms mounted on the shaft, extending radially therefrom in the same direction; cable means connecting the first pair of retractor arms to the road wheel-set axles and the second pair of retractor arms to the rail wheel-set axle; a pair of spaced crank arms mounted on the shaft and extending radially therefrom in angular relation to the retractor arms; spring powered activating cylinders tiltably mounted, through trunnion bearings, on the underside of the frame in longitudinal alignment with each of the crank arms; piston and piston-rod means in said cylinders movable in a straight line, in and out of said cylinders and connected at their outer ends to the crank arms; expansion spring means in the cylinders normally urging the piston and piston-rod means from a first, retracted, position to a second, fully extended, position; neutralizing means in the cylinders intermittently operative on the pistons to negate the force of the expansion spring means and move the piston and piston-rod means to their first positions; reaction means, between each cylinder and the vehicle frame, effective when the piston-rod means in their first positions, to alternately tilt the cylinders between a first position, wherein the cylinders are downwardly inclined, and a second position, wherein the cylinders are upwardly inclined, relative to the axis of the retractor shaft; when the cylinders are in their first positions, with the neutralizing means inoperative, the thrust of the expansion spring means urges the piston-rods to their second positions which imparts a clockwise moment of rotation to the crank arms and retractor shaft, and swings the first and second pair of retractor arms to a first position, wherein their attached cables raise and stow the rail wheel-set axle and release the road wheel-set axles for engagement with a traction surface; when the cylinders are in their second positions, with the neutralizing means inoperative, the thrust of the expansion spring again urges the piston-rods outward to their second positions to impart a counter-clockwise moment of rotation to the crank arms and retractor shaft and swing the first and second retractor arms to a second position, wherein the attached cables raise and stow the road wheel-set axles and release the rail wheel-set axles for engagement with a traction surface.

7. A road-rail vehicle, as defined in claim 6, wherein each of the retractor shaft activating cylinders has an air duct through its head end, on the side of the piston opposite to that engaged by the expansion spring, connected to the compressed air distribution system valving means, which upon activation, acts to deliver compressed air to the cylinder on the side of the piston opposite to that engaged by the expansion spring, to neutralize the spring force and allow the cylinder to be tilted by the reaction means between its first and second positions, or vice-versa.

8. A road-rail vehicle, as defined in claim 6, in which the first and second pairs of retractor arms are of unequal length, proportioned to the linear cable travel required to raise and stow the road or rail wheel-set axles.

9. A road-rail vehicle, as defined in claim 6, having cable sheaves journaled on the frame above each road wheel-set axle, over which the retractor cables travel from their respective axles to the first pair of retractor arms, to provide a substantially vertical travel path for the axles between their load-bearing and stowed positions.

10. A road-rail vehicle, as defined in claim 6, wherein the reaction means comprises elongated multi-leaved torsion springs, anchored at one end to the activating cylinders, at their trunnion bearings, and at their other ends to the vehicle frame; the torson springs being loaded by reaction to the inflation and expansion of the road wheel-set axle air-springs acting through the road wheel-set axle cables during the transfer of the vehicle load from the rail to the road wheel-set axles.

11. A road-rail vehicle, as defined in claim 6, wherein the retraction shaft activating cylinder expansion and torque springs react in unison, to provide cumulative moments of rotation about the retractor shaft, expressed in values of inch-pounds of torque, adequate to do the work required to both lift and stow either the road or rail wheel-set axles without stalling, when the axle retractor system passes through a neutral point whereat the crank arms and cylinder piston means are aligned in a straight line.

12. In a vehicle of the character described, a frame structure having amounting plate for each of the four road wheel-set axle air-springs; an invaginating sleeve air-spring detachably anchored between each mounting plate and the road wheel-set axles, comprising, a cylindrical pedestal, permanently mounted on the axle in alignment with the mounting plate, having a closure cap, defining a circumferential shoulder at its upper end; a cylindrical piston head, of a diameter the same as that of the pedestal, seated on the pedestal shoulder, and detachably anchored to the closure cap through bolt means; a hollow cylindrical bell, of larger diameter than the piston head, having a circumferential sealing flange as its open end, detachably anchored on the mounting plate for limited travel, in a horizontal plane, longitudinally of the frame; a tubular, flexible invaginating sleeve, having sealing beads at its upper and lower ends formed integral therewith; means for joining the upper and lower sleeve beads in gas-tight, sealed, engagement with the bell flange and piston head, to provide a gas-tight envelope; the piston head being movable, with the axle on which it is mounted, toward and away from the bell, between a first position, spaced downwardly of the bell, when the sleeve is fully inflated and extended, and a second position, nested within the bell, when the sleeve is in an invaginated, fully deflated condition, with the axle in a raised and stowed position.

13. In a road-rail vehicle of the character described, a pneumatic control system, for selectively inflating and deflating the road wheel-set and rail wheel-set axle air-springs in alternate sequence, and operable to raise and maintain either road or rail wheel-set axles in a stowed position, leaving the other wheel-set in a load-bearing position engaged with a traction surface, comprising, a brake-pipe which during normal operation of the vehicle is charged with compressed air; a single, manually operated, three position, transfer-control valve connected to each of the wheel-set air-springs and retractor shaft activating cylinders; a frame-leveling valve, connected in series with the brake-pipe and transfer-control valve, responsive to change in the level of the vehicle frame above the axle of the particular wheel-set that is in a load-bearing position, to selectively connect the transfer-control valve to the brake-pipe, to the atmosphere, or cut off communication to either when the frame is at a predetermined level; the transfer-control valve being manually movable between a first, transfer, position wherein all the air-springs are inter-connected to equalize their pressure and lower the frame level, with the retractor shaft activating cylinders connected, for pressurization, to the brake-pipe through the leveling valve, to neutralize the retractor shaft activating cylinder springs and allow the stowed wheel-set axles to lower to a traction surface engaging position; a second, highway, position wherein the road wheel-set air-springs are connected, for inflation, to the brake-pipe through the leveling valve, with the rail wheel-set air-springs and the retractor shaft activating cylinder vented to the atmosphere, allowing the retractor shaft activating cylinder springs to expand to raise and stow the rail wheel-set axles, leaving the road wheel-set axles in a load-bearing position; and, a third, rail, position wherein the rail wheel-set air-springs are connected, for inflation, to the brake-pipe through the leveling valve, with the road wheel-set air-springs and the retractor shaft activating cylinders vented to the atmosphere, allowing the retractor shaft activating cylinder springs to expand to raise and stow the road wheel-set axles, leaving the rail wheel-set axles in a load-bearing position.

14. A pneumatic control system for a road-rail vehicle, as defined in claim 13, in which the manually operated transfer-control valve comprises, a body having a plug bore therein; a two-level plug, having a first, air-exhaust, level and a second, air-delivery, level, mounted in said body bore, for rotation between three positions; the plug having first and second bores extending cross-wise thereof in each of the two levels, with the second bores in both levels inter-connected at their mid-points; the plug also having a third, diametric bore in the second level which avoids the first and second bores, and, first and second, circumferentially spaced, grooves in the face of the plug, extending between the first and second levels, vented to the atmosphere; the valve body having a first air-delivery duct, connected to the rail wheel-set air-springs and a second air-delivery duct, connected to the road wheel-set air-springs, simultaneously alignable with the plug second level, second bore, when the plug is in its first position, and alternately alignable with the first bore when the plug is in its second or third position; check-valves in each of said ducts operable to oppose back-flow of air from the rail and road wheel-set air-springs; a third air-delivery duct in the body at the plug second level, connected to the frame-leveling valve at its air-delivery side, selectively alignable with the plug second level, third bore when the plug is in its first position, and with the plug second level, first bore when the plug is in its second or third position; a fourth duct in the body, at the plug second level, connected to the retractor shaft activating cylinders, selectively alignable with the plug second level, third bore, when the plug is in its first position and with the first or second air-vent grooves, when the plug is in its second or third position; the valve body also having a first air-exhaust duct at the plug first level, connected to the rail wheel-set air-springs, and a second air-exhaust duct, connected to the road wheel-set air-springs, simultaneously alignable with the plug first level, second bore, when the plug is in its first position, and alternately alignable with the plug first level, first bore, when the plug is in its second or third position; check-valves in each of said ducts, operable to oppose flow of air into the rail and road wheel-set air-springs; and a third air-exhaust duct in the valve body, at the plug first level, connected to the frame leveling valve at its air-exhaust side, and alternately alignable with opposite ends of the plug first level, first bore, when the plug is in its second or third position; at the first, or transfer, position the plug first level, second bore is aligned with the first and second air-exhaust ducts, the plug second level, second bore, is aligned with the first and second air-delivery ducts and the third bore is aligned with the third and fourth air-delivery ducts, to effect equalization of the air pressure in all the rail and wheel-set air-springs and neutralization of the retractor shaft activating-cylinder springs, to move the stowed wheel-set axles to a traction-surface engaging position; at the second, or highway position, the plug first level, first bore is aligned with the second and third air-exhaust ducts, the second air-vent groove is aligned with both first air-delivery and air-exhaust ducts, the plug second level, first bore is aligned with the second and third air-delivery ducts, while the first air-vent groove is aligned with the fourth duct, to effect inflation of the road wheel-set air-springs and maintain the road wheel-set axles in a load-bearing position, while simultaneously venting the rail wheel-set air-springs and effecting the raising and stowing of the rail wheel-set axle; at the third, or rail position, the plug first level, first bore is aligned with the first and third air-exhaust ducts, the first air-vent groove is aligned with both second air-delivery and air-exhaust ducts, the plug second level, first bore is aligned with the first and third air-delivery ducts, and, the second air-vent groove is aligned with the fourth duct, to effect inflation of the rail wheel-set air-springs and maintain the rail wheel-set axle in load-bearing position, while simultaneously venting the road wheel-set air-springs and effecting the raising and stowing of the road wheel-set axles.

References Cited

UNITED STATES PATENTS

| | | | |
|---|---|---|---|
| 1,179,182 | 4/1916 | Hofmann | 267—15 |
| 2,016,626 | 10/1935 | Constantinesco | 105—215 |
| 2,133,279 | 10/1938 | Brown | 267—15 |
| 2,848,956 | 8/1958 | Deist | 105—224 XR |
| 2,889,785 | 6/1959 | Browne | 105—215 |
| 3,286,657 | 12/1966 | Browne | 105—215 |

ARTHUR L. LA POINT, *Primary Examiner.*

H. BELTRAN, *Assistant Examiner.*